United States Patent
Maalioune et al.

(10) Patent No.: US 9,057,342 B2
(45) Date of Patent: *Jun. 16, 2015

(54) CONTROL SYSTEM FOR A TURBOREACTOR NACELLE

(75) Inventors: Hakim Maalioune, Orgeval (FR); Vincent Le-Coq, Saint Romain-de-Colbosc (FR); Pierre Moradell-Casellas, Saint Georges des Groseillers (FR); Djemouai Hadjidj, Massy (FR); Guillermo Garcia Soto, Massy (FR)

(73) Assignees: AIRCELLE, Gonfreville l'Orcher (FR); HISPANO SUIZA, Colombes (FR)

( * ) Notice: Subject to any disclaimer, the term of this patent is extended or adjusted under 35 U.S.C. 154(b) by 709 days.

This patent is subject to a terminal disclaimer.

(21) Appl. No.: 13/264,893

(22) PCT Filed: Apr. 6, 2010

(86) PCT No.: PCT/FR2010/050662
§ 371 (c)(1),
(2), (4) Date: Oct. 17, 2011

(87) PCT Pub. No.: WO2010/119209
PCT Pub. Date: Oct. 21, 2010

(65) Prior Publication Data
US 2012/0031071 A1 Feb. 9, 2012

(30) Foreign Application Priority Data

Apr. 16, 2009 (FR) ...................................... 09 52509

(51) Int. Cl.
*F02K 1/70* (2006.01)
*B64D 33/04* (2006.01)
*F02K 1/12* (2006.01)
*F02K 1/76* (2006.01)

(52) U.S. Cl.
CPC . *F02K 1/70* (2013.01); *B64D 33/04* (2013.01); *F02K 1/12* (2013.01); *F02K 1/76* (2013.01); *F02K 1/763* (2013.01); *F05D 2270/52* (2013.01); *F05D 2270/54* (2013.01); *F05D 2270/62* (2013.01)

(58) Field of Classification Search
CPC ............. F02K 1/70; F02K 1/76; F02K 1/763; F02K 1/766
USPC ................... 60/226.2, 228, 230; 239/265.19, 239/265.25, 265.31, 265.33; 244/110 B
See application file for complete search history.

(56) References Cited

U.S. PATENT DOCUMENTS 6,439,504 B1 * 8/2002 Ahrendt ................... 244/110 B
6,681,559 B2 * 1/2004 Johnson ......................... 60/204

(Continued)

FOREIGN PATENT DOCUMENTS

EP    1413735 A1    4/2004
EP    1413736 A1    4/2004

(Continued)

OTHER PUBLICATIONS

International Search Report issued Oct. 5, 2010 by European Patent Office re: International Application No. PCT/FR2010/050662; citing EP 1 413 736 A, EP 1 413 735 A, FR 2 882 097 A, GB 2 372 729 A, US 2003/101712 A1 and EP 1 413 737 A.

*Primary Examiner* — William H Rodriguez
*Assistant Examiner* — Arun Goyal
(74) *Attorney, Agent, or Firm* — Brinks Gilson & Lione (57) ABSTRACT

The invention relates to a system for controlling a plurality of actuators (15) that can displace a mobile panel (13, 17) pertaining to a nacelle (1) of an aircraft, said system comprising at least two motors (16) that can drive the actuators (15). The system also comprises two separate control units (33, 35), each unit being configured in such a way as to control and feed at least one motor that is not fed or controlled by the other control unit. The invention also relates to a nacelle comprising such a system.

18 Claims, 4 Drawing Sheets

(56) References Cited

U.S. PATENT DOCUMENTS

| | | | |
|---|---|---|---|
| 7,370,468 B2 * | 5/2008 | Colotte et al. | 60/226.2 |
| 7,673,442 B2 * | 3/2010 | Seda et al. | 60/226.2 |
| 2003/0101712 A1 | 6/2003 | Johnson et al. | |

FOREIGN PATENT DOCUMENTS

| | | |
|---|---|---|
| EP | 1413737 A1 | 4/2004 |
| FR | 2882097 A1 | 8/2006 |
| GB | 2372729 A | 9/2002 |

* cited by examiner

CONTROL SYSTEM FOR A TURBOREACTOR NACELLE

TECHNICAL FIELD

The present invention relates to a system for controlling a plurality of actuators able to displace a mobile panel belonging to an aircraft nacelle.

BACKGROUND

Aircraft nacelles are intended to house a turboreactor, in particular a dual-flow turboreactor capable of generating a hot air flow (also called primary flow) coming from the combustion chamber of the turboreactor, and a cold air flow (secondary flow) coming from the fan that circulates outside the turboreactor through an annular channel, also called "jet," formed between a fairing of the turboreactor and an inner wall of the nacelle. The exhaust section of the secondary flow is called "secondary jet nozzle," while the exhaust of the primary flow is done in the primary jet nozzle. Behind the nacelle, the primary and secondary flows mix.

This nacelle is then generally equipped with a thrust reverser. The thrust reverser makes it possible, during landing of an airplane, to improve the braking capacity of the airplane by reorienting at least part of the thrust generated by the turboreactor forward. In this phase, the reverser obstructs the jet nozzle of the gases and orients the jet stream from the engine toward the front of the nacelle, thereby generating a counter-thrust added to the braking of the airplane's wheels.

In this perspective, the thrust reverser comprises varied thrust reversal means, such as in general at least one mobile cowl, called "thrust reverser cowls," moving in translation owing to actuators in a direction substantially parallel to a longitudinal axis of the nacelle. Thus, the mobile cowl(s) can alternatingly go from a closed position, in which the thrust reverser cowl(s) ensure(s) the aerodynamic continuity of the nacelle, to an open position, in which a passage is exposed on a fixed structure of the nacelle to reverse the secondary flow.

Furthermore, an additional device can in particular make it possible to vary the section of the variable secondary jet nozzle. Although several embodiments exist, it is known to use a multitude of jet nozzle flaps able to pivot inside the jet as device so as to vary the width of said jet. In this way, it is possible to adapt the section of the secondary jet nozzle, so as to optimize the specific consumption of the turboreactor or reduce the exhaust noise from the gases depending on the flight phases.

One particular example is the embodiment described in patent Ser. No. 08/04295, where the jet nozzle flaps are situated at the outlet of the jet and also serve to vary the secondary jet nozzle during a limited translation of the thrust reversal cowl(s).

The jet nozzle flaps and the thrust reversal cowls constitute mobile panels. The displacement of such panels is ensured by a plurality of actuators.

The actuators can assume different forms, in particular electromechanical actuators like those described in document EP 0 843 089.

This type of actuator is associated with a control system comprising at least two motors able to drive said actuators. The control system is intended in particular to electrically power the motors and control the operation thereof.

The availability of the system for varying the secondary jet nozzle section is an important consideration and is a key area of the development of electromechanical actuators.

The availability criterion refers to the capacity of the means to be deployed so as to perform the function of adjusting the cycle of the turboreactor and avoid operating in a deteriorated mode. It requires a level of redundancy of the means, without, however, severely damaging the reliability of the entire device, and a suitable architecture for minimizing common modes, such as mechanical blocking.

BRIEF SUMMARY

One aim of the present invention is therefore to provide a system for controlling a plurality of actuators able to displace a mobile panel having great availability.

To that end, according to a first aspect, the invention relates to a system for controlling a plurality of actuators able to displace a mobile panel belonging to an aircraft nacelle, said system comprising at least two motors able to drive said actuators, characterized in that it also has two separate control units, each unit being configured to control and power at least one motor neither powered nor controlled by the other control unit.

In this way, the inventive control system comprises two or more motors per mobile panel. At least one motor belonging to said inventive control system is powered and controlled by a different control unit than the other motors.

The present invention makes it possible to preserve the operation through the transmission of the thrust reverser and/or the system for varying the secondary section when one of the two control units no longer works. The electrical power transmission to the motors can be done with a single available control unit, which makes it possible to increase the availability of the thrust reverser.

According to other features of the invention, the inventive system includes one or more of the following optional features, considered alone or according to all possible combinations:

- the control units are separate and each powered by a power source, the power sources being independent of one another;
- the control units are grouped together within one primary unit;
- each unit delivers sufficient power for a single motor to be able to actuate all of the actuators;
- the inventive system also includes locking means able to immobilize the actuators of the system;
- the locking means are primary bolts associated with a tertiary bolt powered by a power source separate from the two control units;
- the control units each comprise an internal stop means able to stop the power supply of the locking means, the two internal stop means being connected to each other and an external stop means controlled independently of the control units;
- each internal stop means can be controlled by an aircraft computer configured to process data coming from the aircraft and by a nacelle computer configured to process data coming from the turboreactor, said computers being separate and independent;
- the external stop means can be controlled by the aircraft computer;
- the nacelle computer includes electrical synchronization means of the motors;
- the signals of the states of the locking means are managed by the nacelle computer;
- the nacelle computer is powered by two separate electrical power systems that can be kept powered on during the flight of the aircraft and/or that can be cut;

each control unit has a logic synchronization means connected to an internal stop means and an input of a computer of the turboreactor;

each internal and/or external stop means comprises a switch and a control device.

According to another aspect, the invention relates to a nacelle for a dual-flow turboreactor having an outer structure defining an annular flow channel for the cold air flow, said outer structure comprising at least one mobile panel equipped with a control system.

According to one embodiment, the mobile panel is a thrust reversal cowl able to move substantially laterally.

The mobile panel can be a jet nozzle flap pivotably mounted so as to reduce the width of the annular channel.

According to still another advantageous embodiment, the nacelle has at least one thrust reversal cowl and at least one jet nozzle panel.

BRIEF DESCRIPTION OF THE DRAWINGS

The invention will be better understood upon reading the following non-limiting description, done in reference to the appended figures.

DETAILED DESCRIPTION

Figure 1:
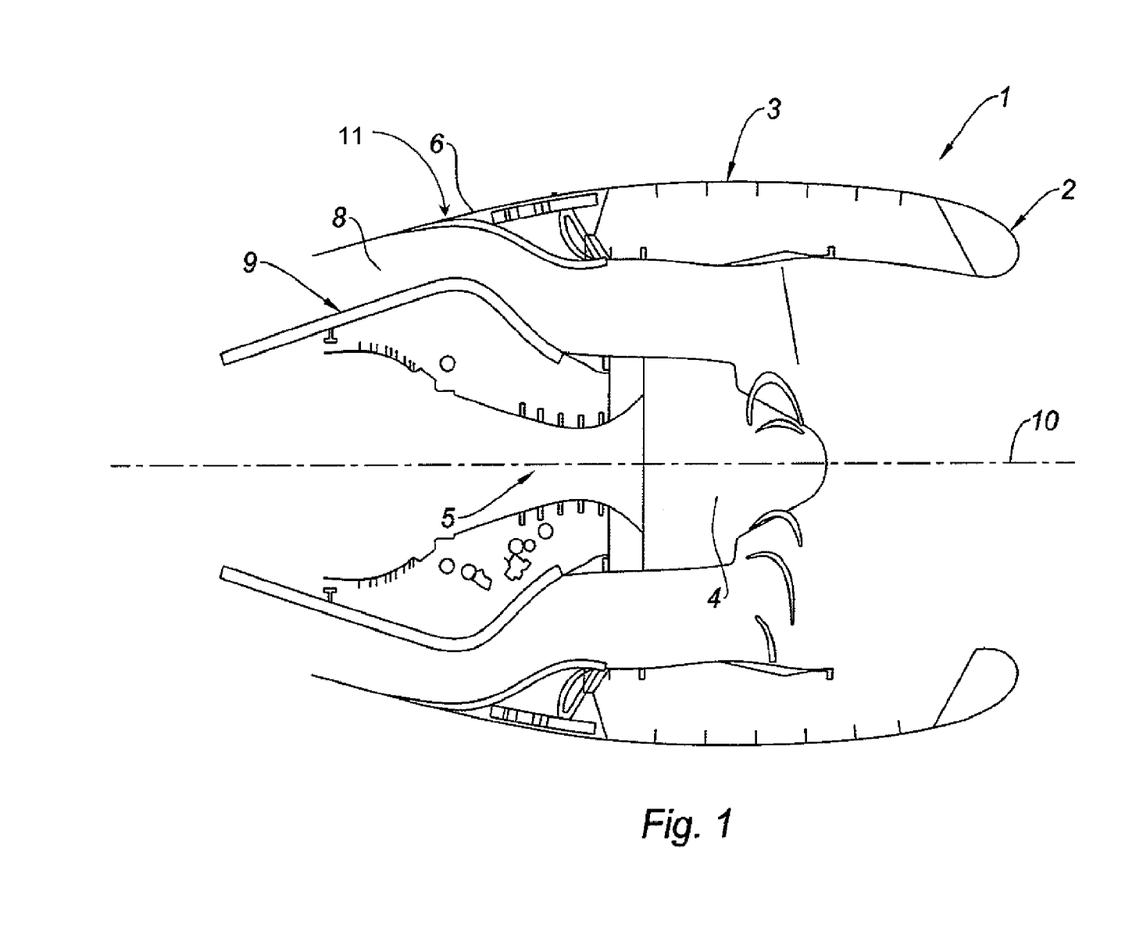
FIG. 1 is a diagrammatic illustration in longitudinal cross-section of a first embodiment of a nacelle according to the invention.
Figure 2:
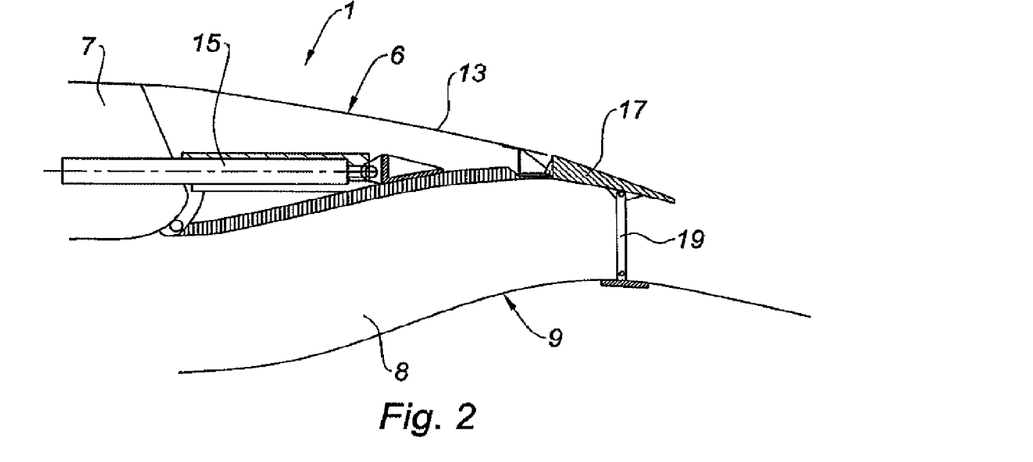
FIGS. 2 and 3 are longitudinal cross-sections of the downstream section of the inventive nacelle.
Figure 3:
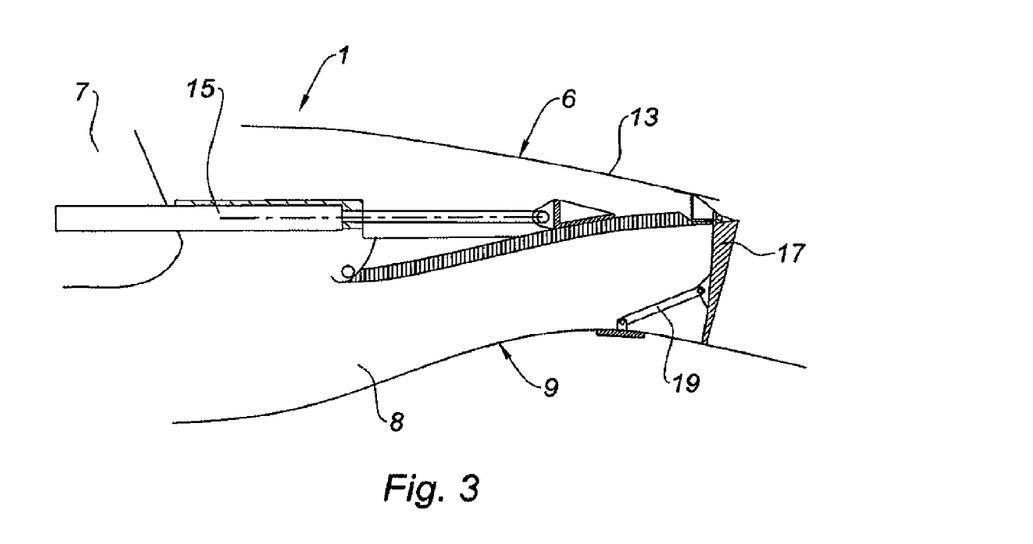

According to the embodiment shown in FIGS. 1-3, a nacelle 1 according to the invention comprises an upstream air intake structure 2, a middle structure 3 surrounding a fan 4 of a turboreactor 5, and a downstream structure. The downstream structure includes, in a known manner, an outer structure 6 (OFS), housing thrust reversal means 7, and an inner structure 9 (IFS), intended to cover the downstream part of the turboreactor 5. The nacelle 1 is fixed downstream using any suitable means, in particular connecting rods, to a suspension pylon, not shown, intended to attach the nacelle 1 under an aircraft wing.

The outer structure 6 and the inner structure 9 define an annular flow channel 8 for the cold air flow.

The inner structure 9 is intended to cover a downstream section 11 of the turboreactor extending downstream of the fan.

The downstream section 11 can be equipped with a thrust reverser, such as a grid thrust reverser.

In that case, the outer structure 6 comprises at least one thrust reversal cowl 13 mounted translationally mobile along a substantially longitudinal axis 10 of the nacelle 1 between a closed position in which the thrust reverser cowl(s) 13 ensure the aerodynamic continuity of the nacelle 1 and an open position in which the thrust reverser cowl(s) 13 form an opening in the nacelle 1 by revealing reverser means of the cold flow (typically reverser grids, not referenced but visible behind the actuator 15).

According to one alternative, the nacelle 1 can have only one or, on the contrary, two or more thrust reverser cowls. Furthermore, the thrust reverser cowls can be connected to each other so that the displacement of one of the cowls 13 drives the displacement of the other cowls 13.

The outer structure 6, and in the case at hand the thrust reverser cowls 13, is extended by a jet nozzle section comprising a plurality of jet nozzle flaps 17 mounted at a downstream end of the thrust reverser cowl 13.

Each jet nozzle flap 17 is for example pivotably mounted by a connecting rod 19 allowing the flap 17, by moving, to decrease the width of the annular channel 8 at least partially, or completely (see FIG. 3).

Thus, when the thrust reverser cowl 13 is opened, it rotates the jet nozzle flap 17, which at least partially covers the channel 8 and thereby optimizes the reversal of the cold air flow.

Thus, the thrust reverser cowls 13 and the jet nozzle flaps 17 constitute mobile panels that can be displaced by a plurality of actuators 15.

Figure 4:
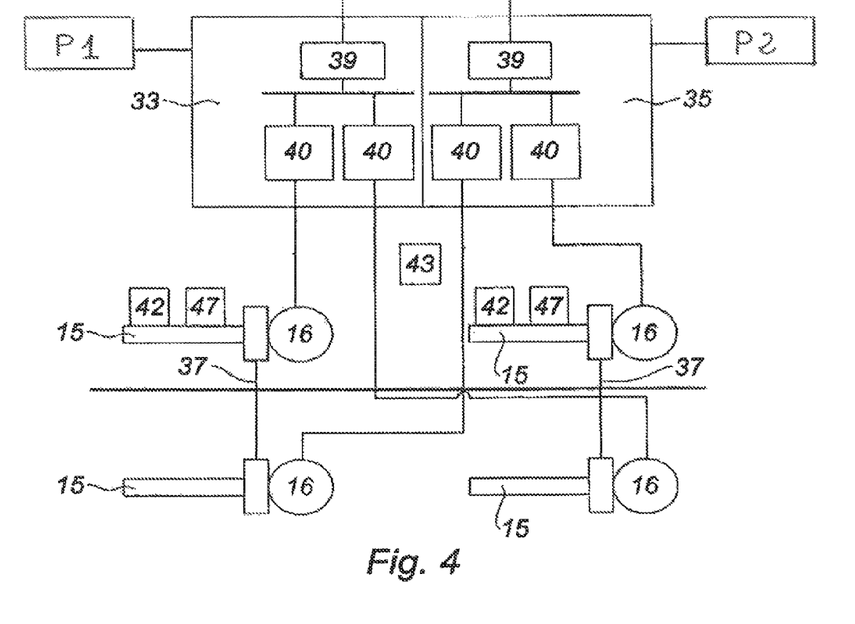
FIGS. 4 and 5 are an example of an embodiment of the inventive control system associated with a pair of mobile panels.
Figure 5:
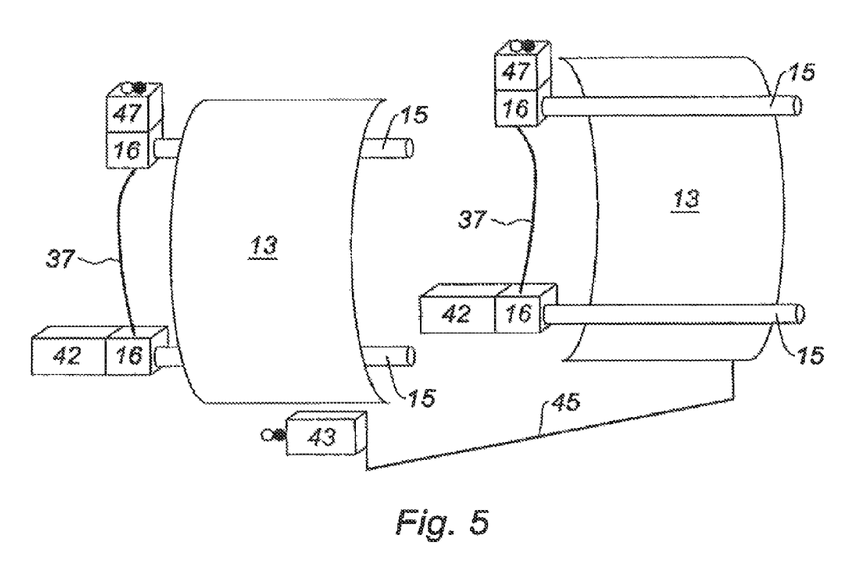

According to the embodiment of FIGS. 4 and 5, each cowl 13 is equipped with two actuators of the electric type each powered by an electric motor. An electric actuator 15 can assume the form of a cylinder mounted on the fixed structure (forward frame) of the outer structure 6. According to one alternative, the number of actuators 15 on a mobile panel 13, 17 can be greater than two, or even equal to three, four or more.

The nacelle 1 has a control system according to the invention making it possible to control the displacement of the actuators 15 of a mobile panel.

Said control system comprises at least two motors 16 able to drive said actuators 15 (see FIGS. 4 and 5).

According to one embodiment, each actuator 15 can be connected to a motor 16 specific to it. According to another alternative, part of the actuators can be connected to more than two motors, the other actuators then being connected to said portion of the actuators so that they can be driven.

The control system also has two separate control units 33, 35, each unit 33 and 35 being configured to control and power at least one motor 16 neither powered nor controlled by the other control unit 35 and 33.

Thus, the control system according to the invention comprises two or more motors per mobile panel. At least one motor belonging to said control system according to the invention is powered and controlled by a different control unit than the other motors.

Advantageously, if one control unit 33 or 35 no longer works, the other control unit 35 or 33 still powers the motor(s) 16 connected to it. As a result, the mobile panel 13, 17 is driven by the actuator(s) 15 whereof the motor 16 is still powered.

Thus, the availability of the thrust reversal means is increased inasmuch as, in the event of a malfunction of a unit 33, 35, the mobile panel 13, 17 is driven by at least one actuator 15.

Furthermore, the nacelle 1 has only two control units 33 and 35 to power all of the motors 16 and no longer one control unit per motor. Thus, the bulk due to the power supply of said motors 16 is reduced.

According to one embodiment, the motors 16 are all mechanically connected to each other, for example by flexible cables ("flexshaft"). Advantageously, when a breakdown appears at a control unit 33 or 35, all of the actuators 15 are driven by the mechanical transmission.

According to still another embodiment, the nacelle 1 has an actuating system configured to actuate the actuators 15. Said system comprises the motors 16 powered by the two power supply units 33 and 35 and able to drive said actuators 15. The actuators 15 are also mechanically connected to each other by a mechanical transmission 37. Thus, in the event of a malfunction of a unit 33 or 35, the motor(s) 16 driven by the other unit 33 or 35 suffice to actuate all of the actuators 15 to displace the mobile panel 15.

The mechanical transmission 37 is typically chosen so as to minimize the actuation delay of the two remaining motors 16 in case of breakdown. As a result, the delay between the actuators 15 of a mobile panel is reduced.

The mechanical transmission 37 can include one or more flexible cables in order to enable an easy installation in the nacelle.

According to one embodiment, a single actuator or part of the actuators is configured to be driven by all of the motors, the other actuators being driven by one or more mechanical transmissions.

Preferably, each unit 33, 35 can deliver a sufficient power for a single motor 16 to be able to drive all of the actuators 15. Thus, in the event of breakdown, a control unit 33 or 35 can operate the actuators 15. Each control unit 33 and 35 is independent, although in nominal mode, both units 33 and 35 are necessary. One thus further increases the availability of the thrust reversal means.

Usually, additional transmission shaft synchronization hoses are necessary to transmit the power or synchronize the positions of the actuators. A nacelle computer able to collect data coming from the turboreactor 5 and the nacelle 1 can also synchronize the control of the position of the motors 16 through an electric control to do away with the synchronization hoses. In this way, it is no longer necessary to adjust the hoses relative to each other upon each locking of the mobile panels 13, 17 during maintenance, which makes it possible to save time.

The control units 33 and 35 can be grouped together within a primary unit. According to one alternative, the control units 33 and 35 can be separated and each powered by a power source P1 and P2, the power sources P1 and P2 being independent of each other. In this way, it is possible to minimize the risk of breakdown of the two units, in particular breakdown of the short circuit type.

Preferably, each control unit 33 and 35 has a control device 39 controlling at least one inverter 40 powering one or more motors 16 (not shown). The control device 39 makes it possible to control and manage the power of the rectification of up to each inverter 40.

In the case where each inverter 40 powers a motor 16, the motors 16 are then controlled independently. Thus, if an inverter 40 is no longer working, the non-powered motor 16 is driven by the other motor 16 of the pair of actuators via the mechanical transmission 37.

The nacelle 1 can have means for controlling the speed of each motor 16 able to correct said speed thereof. In this way, it is possible to control the speed of each motor 16 so as to allow a homogenous displacement of the thrust reversal cowls 13.

Typically, the control means correspond to a position-measuring member for example comprising a "resolver" and continuously delivering at least one value making it possible to determine the position of the motor and allow its control. More specifically, a resolver is an angular sensor whereof it is possible to compute a position relative to a selected fixed reference. It is possible to attach a resolver or linear (LVDT) angular measuring device thereto so as to have a precise absolute measurement of the position of the actuator, in particular the shaft of the cylinder, at the mobile panel.

Advantageously, the position members as well as the revolution counters of an actuator 15 can also each be powered by one of the two control units 33 or 35.

Furthermore, the nacelle 1 can include means for electrically synchronizing the motors 16 relative to each other so as to guarantee a substantially synchronized displacement of the mobile panels 13, 17 relative to each other.

As a result, the risk of one thrust reverser cowl 13 being moved faster than the other, which could unbalance the aircraft in the thrust reversal configuration, is limited.

In the event of breakdown of a control unit 33 or 35 or an inverter 40, the positioning error of the actuators 15 and therefore of the mobile panels 13, 17 is made minimal enough to be tolerated by the turboreactor 5.

As an example, the electrical synchronization means can allow a mixed torque-position control so as to optimize the control and smooth any power withdrawal.

For example, in the acceleration and deceleration phases, the steering of the motor 16 can be based preponderantly on a torque control with overspeed limitation, while the speed-stabilized phases can be carried out by regulating the speed and torque limitation.

Advantageously, in the embodiments shown in FIGS. 4 and 5, the elements making it possible to vary the section of the annular channel 8 as well as the elements allowing the thrust reversal can be grouped together.

According to one preferred embodiment, the control system includes locking means able to lock the actuators 15 in their travel or at their end of travel. The locking means can assume the form of bolts that can be gathered together.

As indicated above, there are two types of bolts. Typically, the first type is made up of primary and secondary bolts 42 each arranged on actuators 15 of a mobile panel. The second type is formed by one or more tertiary bolts 43, isolated relative to the mobile panels 13, 17 but connected to the latter via a structural connection 45, such as a cable that may or may not be flexible.

Typically, this tertiary bolt 43 is arranged at 6:00 relative to the mobile panels 13, 17, in particular the thrust reverser cowl 13. The 6:00 direction is defined relative to the nacelle 1 when it is mounted on a wing of an aircraft and seen by the upstream air intake structure 2.

In parallel, locking means 47, or "secondary jet nozzle brakes," exist making it possible to lock or control the flaps 17 in a position ensuring the total or partial closing of the annular channel 8, for example via actuators. There are typically two of these brakes 47 each arranged on a mobile panel 13, 17.

According to the embodiment shown in FIG. 4, the primary and secondary bolts 42 and the jet nozzle brakes 47 of a same mobile panel can be arranged on different actuators 15, in particular two different actuators.

According to an alternative shown in FIG. 5, the primary and secondary bolts 42 and the jet nozzle brakes 47 of a same mobile panel can be arranged on a same actuator.

Each control unit 33 or 35 can house other functions, such as the deicing control of the air intake lip 2 and the electronic control of the primary and secondary bolts 42.

Figure 6:
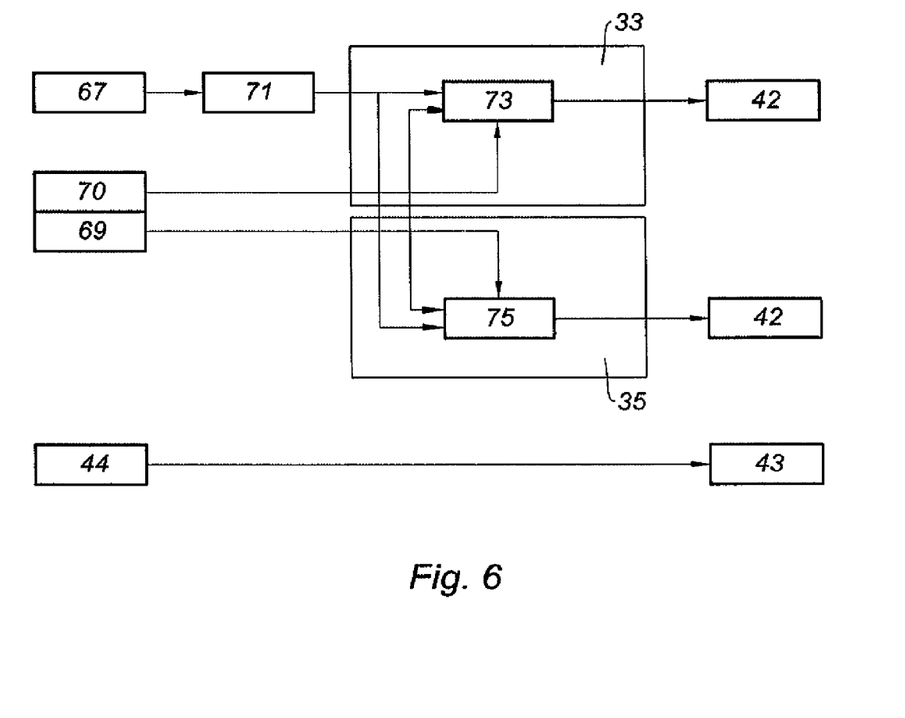
FIG. 6 is a diagrammatic illustration of one embodiment of the locking means belonging to the inventive control system.

Thus, according to a first embodiment shown in FIG. 6, the primary and secondary 42 and tertiary 43 bolts used in the context of the invention are electrically controlled separately and independently so as to ensure optimal security in case of breakdown according to the aeronautics regulation (cs25-933). This regulation requires protection of the control systems of the thrust reversers against the risks of untimely deployment by setting up three lines of defense ensuring locking and a system for activating the unlocking whereof the control must be separate and independent, according to a segregation principle.

The tertiary bolt 43 is controlled by a first aircraft computer 44 having means for locking or unlocking said bolt 43. The first aircraft computer can process data coming from the aircraft, such as altimetric data or data representative of the weight exerted on the wheels of the landing gear.

The primary and secondary bolts 42 can be controlled via sensors 61.

The primary and secondary bolts 42 and/or the sensors 61 are connected to the control units 33 and 35. The two control units 33 and 35 can each have logic synchronization means able to trigger the actuation of the primary bolt 42 in a synchronized manner. To that end, said synchronization means are connected to each other. According to one alternative, it is possible for one logic synchronization means to be used in place of the two. These synchronization means are each connected to a second aircraft computer 67, able to process data coming from the aircraft, and also to one or more nacelle computers 69 and 70 able to process data coming from the turboreactor 5.

The second aircraft computer 67 and the nacelle computer 69 and 70 can be outside the control units 33 and 35, which makes it possible to further improve the security of the control system of the primary and secondary bolts 42.

The second aircraft computer 67 typically processes data from the aircraft not connected to the turboreactor, such as altimetric data or data representative of the weight exerted on the wheels of the landing gear.

According to one embodiment, the aircraft computers 69 and 70 can be configured to synchronize the position control of the motors 16 by an electric control.

In order to tolerate simple electrical breakdowns, the nacelle computer 69 and 70 can comprise two independent electricity sources or two independent and autonomous internal paths. In the latter case, each path can comprise an interface with a unique electricity source, a set of inverters 40 that control at least half of the electric motors 16, an electronic card for steering and managing the inverters 40, a device for electrical activation and control of the mechanical maintenance of the structure for the variable jet nozzle function, an electrical activation and control device for maintenance of the locking means 42, 43, an interface for communicating with a nacelle computer, a communication interface between the two paths of the nacelle computer 69, 70.

This computer architecture makes it possible to make the control system tolerant to a loss of an electrical power source while preserving the performance of the control system, a loss of one or a set of inverters of the same path, a loss of activation (open circuit) of an electrical actuating motor, a loss of the mechanical transmission of two adjacent actuators, or a loss of a maintenance device.

Thus, advantageously, the nacelle computer 69 and 70 does not need any electronic redundancy and the number of components is reduced.

To keep the secondary jet nozzle in position, one or both nacelle computers 69 and 70 can steer and maintain the jet nozzle flaps in the desired position. More advantageously, the nacelle 1 can also comprise a mechanical maintenance device immobilizing the displacement of the actuators 15 to improve the output, compactness and reliability of the control system. This function can be of the "failsafe brake" type so as to maintain the locking without electricity consumption, the availability being ensured by the dual steering of the control member of the brake by the nacelle computers 69 and 70.

In the case of FIG. 6, each internal stop means 73 and 75 is connected to a nacelle computer 69 and 70. It is also possible for a nacelle computer 69 and 70 to comprise two separate sub-units each able to control an internal stop means 73 and 75 independently. Thus advantageously, a single path is sufficient for the physical control.

In the case where the control units 33 and 35 comprise one or more logic synchronization means, the output(s) of the nacelle computer(s) 69 and 70 are connected to an input of the logic synchronization means that in turn connect an internal stop means 73 or 75. In other words, the order to "close" or "stay open" sent to the internal stop means 73 and 75 passes through the synchronization means so as to synchronize the opening or closing of said internal stop means 73 and 75. Security systems are arranged so as to prevent any untimely operation of one or more primary and secondary bolts 42.

To that end, an external stop means 71 is inserted between the input of the control units 33 and 35 and the second aircraft computer 67. Furthermore, each control unit 33 and 35 includes an internal stop means 73 and 75 arranged inside said units 33 and 35 and also connected to the external stop means 71.

The internal 73 and 75 and external 71 stop means act as switches by allowing or not allowing the passage of locking or unlocking orders toward the primary bolts 42. In that perspective, the internal 73 and 75 and external 71 stop means can comprise a control member and a switch. Said control member can then be directly connected to the output of the computer(s) 67 or 69 and 70 and/or to the synchronization means.

The second aircraft computer 67 and the nacelle computer 69 and 70 both act on the opening or closing of the internal stop means 73 and 75.

Furthermore, in order to decrease any risk of untimely opening of a primary or secondary bolt 42, the two internal 73 and external 75 stop means are electrically connected.

Thus, in the event it is necessary to actuate the two primary and secondary bolts 42, the second aircraft computer 67 sends an order to close the external stop means 71.

For the internal stop means 73 and 75 also to close, it is necessary for the nacelle computer 69 to send the same order as the second aircraft computer 67. In that case, the two internal stop means 73 and 75 close, then actuating the primary and secondary bolts 42 via the sensor.

When the external stop means 71 is closed by a bad order from the second aircraft computer 67 not confirmed by the nacelle computer 69, the two internal stop means 73 and 75 remain open, therefore not triggering the unlocking of the two primary and secondary bolts 42.

If, despite the order from the nacelle computer 69 not to close the internal stop means 73 and 75, one of its inputs sends the order to close an internal stop means 73 and 75, the electronic connection between the two internal stop means 73 and 75 prevents the closing of said means.

Although the locking means 42, 43 and the control means thereof, one embodiment of which is shown in FIG. 6, are described in connection with the motors and the power supply and control means thereof, it is possible to have locking means 42, 43 and their control means in a nacelle not having a control system including two separate control units 33, 35, each being configured to control and power at least one motor neither powered nor controlled by the other control unit.

In case of flight, the thrust reverser is generally kept powered off. As a result, no electrical current passes through the thrust reverser. This makes it possible to prevent an untimely implementation of electronic origin of the thrust reverser.

In the case of jet nozzle flaps, the electrical power of the nacelle computer 69 and 70 is maintained during flight to make it possible to displace the secondary jet nozzle section.

In fact, according to the different cruising powers, it is sometimes necessary to vary the secondary air flow and therefore the width of the annular channel 8.

Thus, according to one embodiment, the nacelle computer 69 and 70 incorporates an external control of the primary and secondary bolts 42, to restore the necessary level of segregation. This control can be consolidated internally in the nacelle computer 69 and 70 by introducing a protective barrier that combines this external command with an order coming from the turboreactor 5.

Furthermore, to comply with security constraints, this command line of the locking means 42, 43 can be confined and isolated from the rest of the nacelle computer 69 and 70.

In order to allow opening of the primary and secondary bolts 42 even in case of a loss of a path of the nacelle computer 69 and 70, it is possible for each path made autonomous to be capable of steering the two primary and secondary bolts 42. In this scenario, the command is consolidated by a logic internal to the nacelle computer 69 and 70 to prevent any untimely activation.

The nacelle computer 69 and 70 can also incorporate a command of the device for maintaining the variable secondary jet nozzle. To improve availability, each path of the nacelle computer 69 and 70 can be capable of deactivating all of the maintenance devices.

In another embodiment, the nacelle computer 69 and 70 can be configured to ensure the maintenance of the structure without introducing an additional mechanical device, or the maintenance in position of the secondary variable jet nozzle can be ensured by suitable steering of the motor in a position loop.

The invention claimed is:

1. A system comprising:
   at least one mobile panel belonging to an aircraft nacelle;
   a plurality of actuators on each of said at least one mobile panel;
   at least two motors driving said plurality of actuators, wherein each one of said plurality of actuators is controlled by its own motor from said at least two motors; and
   first and second control units,
   wherein the first control unit controls and powers at least one of said at least two motors,
   wherein the second control unit controls and powers others of said at least two motors, and
   wherein said at least two motors are neither powered nor controlled by other one of said first and second control units.

2. The system according to claim 1, wherein the first and second control units are separate and each powered by a power source, the power sources being independent of one another.

3. The system according to claim 1, wherein the first and second control units are grouped together within one primary unit.

4. The system according to claim 1, wherein each of the first and second control units delivers sufficient power for a single motor configured to actuate said plurality of actuators.

5. The system according to claim 1, further comprising locking means immobilizing said plurality of actuators.

6. The system according to claim 5, wherein the locking means are primary bolts associated with a tertiary bolt powered by a power source separate from the first and second control units.

7. The system according to claim 6, wherein the first and second control units each comprise an internal stop means configured to stop the power supply of the locking means, the two internal stop means being connected to each other and an external stop means controlled independently of the first and second control units.

8. The system according to claim 7, wherein each internal stop means is controlled by an aircraft computer configured to process data coming from an aircraft and by a nacelle computer configured to process data coming from a turboreactor, said nacelle computers being separate and independent.

9. The system according to claim 8, wherein the external stop means is controlled by the aircraft computer.

10. The system according to claim 9, wherein the nacelle computer includes electrical synchronization means of said at least two motors.

11. The system according to claim 8, wherein signals of the states of the locking means are managed by the nacelle computer.

12. The system according to claim 8, wherein the nacelle computer is powered by two separate electrical power systems that are powered or cut on during flight of the aircraft.

13. The system according to claim 7, wherein each of the first and second control units has a logic synchronization means connected to the internal stop means and an input of a computer of a turboreactor.

14. The system according to claim 13, wherein each of the internal and external stop means comprises a switch and a control device.

15. A nacelle for a dual-flow turboreactor having an outer structure defining an annular flow channel for a cold air flow, said outer structure comprising at least one mobile panel equipped with the system according to claim 1.

16. The nacelle according to claim 15, wherein the at least one mobile panel is a thrust reversal cowl configured to move substantially laterally.

17. The nacelle according to claim 15, wherein the at least one mobile panel is a jet nozzle flap pivotably mounted so as to reduce a width of the annular flow channel.

18. The nacelle according to claim 15, further comprising at least one thrust reversal cowl and at least one jet nozzle panel.

* * * * *